Figure 1:
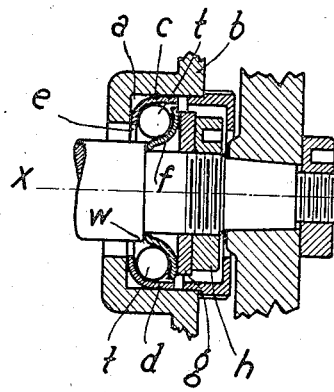

Jan. 28, 1936.  R. ANNEN  2,028,964

BALL BEARING

Filed Jan. 19, 1935

R. Annen
INVENTOR

By: Glascock Downing & Seebold
ATTYS.

Patented Jan. 28, 1936

2,028,964

UNITED STATES PATENT OFFICE 2,028,964

BALL BEARING

Robert Annen, Bienne, Switzerland, assignor to the firm Louis Muller & Cie S. A., Fabrique d'Horlogerie "La Champagne", Bienne, Switzerland, a joint-stock company of Switzerland Application January 19, 1935, Serial No. 2,589
In Germany January 27, 1934

1 Claim. (Cl. 308—184)

The present invention relates to a kind of ball bearings.

Ball bearings having races made of pressed sheet metal are already known. The latter have of course a certain power of resiliency which was used for receiving the radial pressures.

In the ball bearing according to the present invention the races made of pressed sheet metal are mostly not resilient while in the running state. If they are, the resiliency is utilized to adjust the free rolling of the balls or the rolling capacity of the bearing without an additional pressure on the balls. By utilizing this possibility of resiliency the heretofore used gauge limits could be very much widened.

The drawing represents six working forms of the ball bearing according to the present invention.

Figure 2:
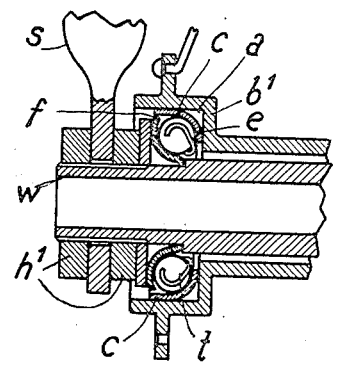
Figure 3:
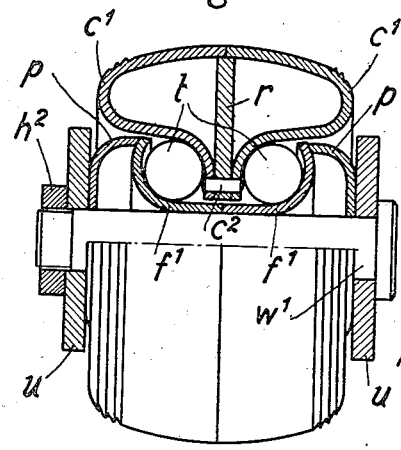
Figure 4:
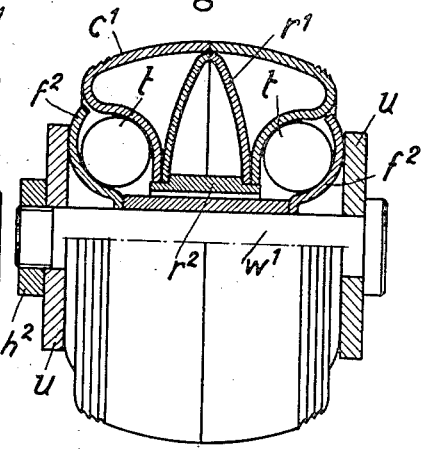
Figure 5:
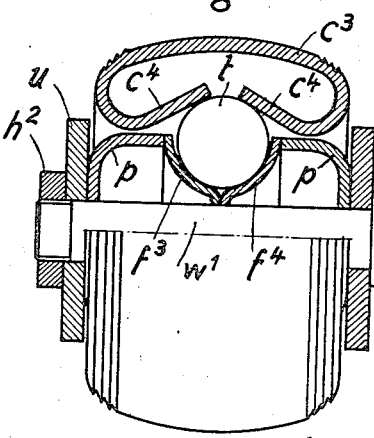

The Fig. 1 is a section through the bearing of a dynamo,

Fig. 2 a section through the axis of a bicycle,

Figs. 3, 4 and 5 partial sections of rollers which may be used for different purposes.

Figure 6:
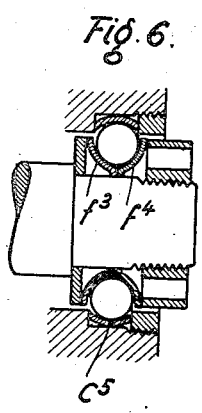
Figure 7:
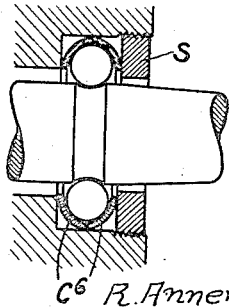

Figs. 6 and 7 represent simplified constructions of a ball bearing according to the invention.

In the hollow $a$ of the side plate $b$ of a field magnet is fixed the outer ball race $c$ of a ball bearing. This race is shaped like a saucer provided with a central hole and having its borders $d$ turned up at right angles from the bottom plate $e$. It is made of sheet steel hardened and somewhat annealed. A further machining is not done on this piece. Due to the used metal and particular manufacturing this piece has a certain resiliency which may serve for compensating for errors in fixing the tolerance. Such a great exactness as is customary with massive and ground ball races is not needed for the parts receiving this outer ball race because it is possible to bend this latter more or less.

The inner ball race $f$ is likewise saucer-shaped. It bears with the borders of its central hole directly on the shoulder of the shaft $w$. The outer borders are used as the ball race. This ring is also pressed of sheet steel and has a certain resiliency which permits of regulating the working of the ball bearing by adjusting the press plate $g$ with the nut $h$ according to need to tenths of a millimeter. It must be remembered that the resiliency of the inner ball race serves here also as a security against the unscrewing of the nut $h$. Therefore no counter nut is needed.

In the Fig. 2 is shown how a ball race arranged according to the present invention may be used in a bicycle. $b^1$ is a nave collar and $w$ the axle. The fork $s$ is held by two nuts $h^1$. The other parts of the bearing have the same letters of reference as in the Fig. 1.

In the Fig. 3 a roller as used for furniture legs is shown. Here are two ball bearings symmetrically side by side. The outside of the ball races $c^1$ is formed by pressing two treads and the inner borders at $c^2$ are riveted to a central web $r$. The inner ball races $f^1$ are fitted tightly to the axle $w^1$ and the whole is held together by means of a nut $h^2$, washers $u$ and collars $p$.

In the working form of the Fig. 4 a double web $r$ is resiliently held in a ring $r^2$. The ball races are similar to those of the Fig. 3 and have the same letters of reference. But by arranging here the washers $u$ directly beside the ball races $f^2$ much room is gained for the balls $t$.

In the form according to the Fig. 5 a roller is formed having one row of balls. The inner ball race is in two parts $f^3$ $f^4$. The outer ball race $c^3$ has two inwardly bent borders $c^4$ forming the race for the balls. Here again collars $p$ transmit the pressure of the washers $u$ to the outer edge of the inner ball race.

The Fig. 6 is a working form where the inner ball races $f^3$, $f^4$ are like the races in Fig. 5. The outer ball race $c^5$ however is formed from a piece of a sheet metal tube by pressing it axially so as to obtain a part of a spherical body.

According to the Fig. 7 the inner ball race is lacking. The outer ball race $c^6$ is in two parts stamped from sheet metal. By tightening the nut $s$ the ball bearing is held resiliently in an annular hollow.

What I claim is:—

In a ball bearing arrangement having ball races made of sheet metal and in combination inner ball races made of metal strips with bent up borders and outer ball races of the same character both ball races being capable of some resiliency, an adjusting member adapted to subject said ball races to an axial pressure so as to produce a deformation of at least one of said races and a set of balls guided by said ball races.

ROBERT ANNEN.